(12) United States Patent
Silver

(10) Patent No.: US 6,240,174 B1
(45) Date of Patent: May 29, 2001

(54) TWO WAY TRANSMISSION OF SUBSCRIBER PROVISIONAL DATA FOR AN INTELLIGENT PERIPHERAL IN AN ADVANCED INTELLIGENT NETWORK (AIN)

(75) Inventor: Jonathan J. Silver, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,663

(22) Filed: May 14, 1998

(51) Int. Cl.[7] ................................................ H04M 3/42
(52) U.S. Cl. ...................... 379/230; 379/219; 379/220; 379/229; 379/207
(58) Field of Search .................................. 379/219, 220, 379/225, 229, 201, 207, 112, 900, 901, 230, 231

(56) References Cited

U.S. PATENT DOCUMENTS

| 6,014,437 | * | 5/2000 | Acker et al. | ............................ 379/219 |
| 6,016,334 | * | 1/2000 | Kasrai | .................................... 379/207 |
| 6,061,685 | * | 5/2000 | Fantenberg | ................................ 707/10 |

* cited by examiner

Primary Examiner—Ahmad Matar
Assistant Examiner—William J. Deane, Jr.
(74) Attorney, Agent, or Firm—Fleit, Kain, Gibbons, Gutman & Bongini P.L.; Jon A. Gibbons

(57) ABSTRACT

An Automated Intelligent Network (AIN) telephone system with a central office switching system. The AIN system includes a service provider system for providing customizable subscriber services based upon subscriber-specific data stored in an EMS database. The subscriber-specific data is selectively updated by a service provider. The AIN system further includes an intelligent peripheral system coupled with the central office switching system. The intelligent peripheral system includes a regional relational database for storing regional subscriber-specific data. The intelligent peripheral system further includes: (1) voice peripherals for providing voice announcements and for receiving updates to the regional subscriber-specific data stored on the regional relational database using one or more end user telephones; (2) a direct-dial communications interface for receiving updates to the regional subscriber-specific data on the regional relational database using one or more end-user data entry devices coupled to the intelligent peripheral system; and (3) a bidirectional data path connected between the intelligent peripheral system and the service provider system for transferring at least part of the regional subscriber-specific data from the regional relational database of the intelligent peripheral system to correspondingly update the subscriber-specific data in stored in the EMS database of the service provider system.

12 Claims, 4 Drawing Sheets

PRIOR ART

FIG. 1  *100*

TWO WAY TRANSMISSION OF SUBSCRIBER PROVISIONAL DATA FOR AN INTELLIGENT PERIPHERAL IN AN ADVANCED INTELLIGENT NETWORK (AIN)

CROSS-REFERENCE TO RELATED APPLICATIONS

Not applicable

BACKGROUND OF THE INVENTION

1. Field of the Invention

The invention disclosed broadly relates to the field of telephony services using an Intelligent Peripheral (IP) in an Advanced Intelligent Network (AIN), and more particularly relates to the two-way transmission of subscriber data between a database directly coupled to an IP and data stored in a service provider's system.

2. Description of the Related Art

In recent times, the number of new services and features offered over enhanced telephone networks has grown. The AIN allows telephone companies to decentralize intelligence away from monolithic switches onto nodes throughout the network. This decentralization increases flexibility, enabling new automation, and making new services possible. These enhanced telephone networks are known as "Advanced Intelligent Networks" (AINs). Telephony control networks conforming to AIN architecture contain intelligent subsystems for controlling switched traffic and subscriber services such as call waiting, call forwarding, voice announcements, voice response, keyboard response, and more. These intelligent subsystems, called "Intelligent Peripherals" (IP), are configured for specific regional calling services.

Along with the quantity of different telephony services being offered, the complexities of many of the newer services have also increased. The increase in provider service offerings is typically accompanied by the need for more subscriber specific data. For example, a provider service such as "find me" where the telephony service will automatically dial a predefined list of telephone numbers in a specified sequence to reach a party. Suppose a subscriber signs up for the service of "find me." An operator for the provider of the "find me" service would take the ordered list of telephone numbers from the subscriber orally over the telephone. The subscriber may give an order list that includes: (1) a work phone number, (2) a car phone number, (3) a cellular phone number, (4) a pager number and (4) a home phone number. The operator for the provider takes this subscriber information over the phone and enters it into the provider's order entry system. Anytime in the future the subscriber wishes to modify his/her specific ordered "find me" list, the subscriber calls the operator for the service provider and orally updates the list with the operator over the telephone. In some service providers systems, the use of IVR (Interactive Voice Response) technique enables the subscriber to modify his/her subscriber specific data. Continuing with the "find me" service, the subscriber can make simple deletions and other modifications to the list using an IVR system that presents audio menus and responds to subscriber selections made via a touch-tone telephone. However, for more complicate changes such as reordering the telephone numbers on the "find me" list, this use of IVR systems can be tedious and difficult. Therefore, a need exists for service providers in an AIN system to provide subscriber with an ability to update subscriber specific data without depending on IVR techniques or the use of operator assistance.

Another problem for providers of telephony services that depend on subscribers specific data is inefficient use of AIN resources, especially the use of network resources. Often the service provider's subsystems in an IP system communicate with other devices, such as SCP (service control points) which is external to the IP system. These communications tie up network and communication resources. The decrease availability of resources makes the overall AIN system respond. It is typical for service providers using IVR techniques to update subscribers specific data in small pieces of data at a time. The frequent occurrences of these small updates result in an increase of traffic on the AIN network. Accordingly, a need exists for AIN service providers to allow the update of the subscriber specific data while keeping the impact to network resources to a minimum.

Still another problem for providers of telephony services that depend on subscribers specific data is the ability to update subscriber data online at the IP. Today, service providers manage subscriber data in a central machine that sends subscriber updates to proprietary databases coupled to Service Control Points (SCPs). Updates made to the central machine are sent to the proprietary database. This is a unidirectional flow from the central machine to the proprietary databases. Updates made directly to the proprietary databases are not sent to the central office machine. Moreover, updates by a subscriber for many services are simply not possible in many proprietary databases. Therefore, a need exists for AIN service providers to provide bidirectional updates between central office machines and subscriber databases coupled to an IP.

SUMMARY OF THE INVENTION

Briefly, in accordance with the present invention, an Automated Intelligent Network (AIN) telephone system comprising at least one central office switching system, an intelligent peripheral subsystems for coupling with a central office switching system, a service provider subsystem for providing customizable subscriber services based upon subscriber-specific data; wherein the subscriber-specific data is selectively updated by a service provider, a method of updating subscriber-specific data comprising the steps of: directly accessing a database for storing subscriber-subscriber-specific data coupled to the intelligent peripheral; selectively updating subscriber-specific data on the database using an IVR (Interactive Voice Response) system coupled to the intelligent peripheral subsystem; selectively updating the subscriber-specific data on the database using a data entry device coupled to the intelligent peripheral subsystem; and transferring at least part of the subscriber-specific data from the intelligent peripheral subsystem so as to correspondingly update the subscriber-specific data in the service provider subsystem.

BRIEF DESCRIPTION OF THE DRAWING(S)

DESCRIPTION OF a PREFERRED EMBODIMENT

Figure 1:
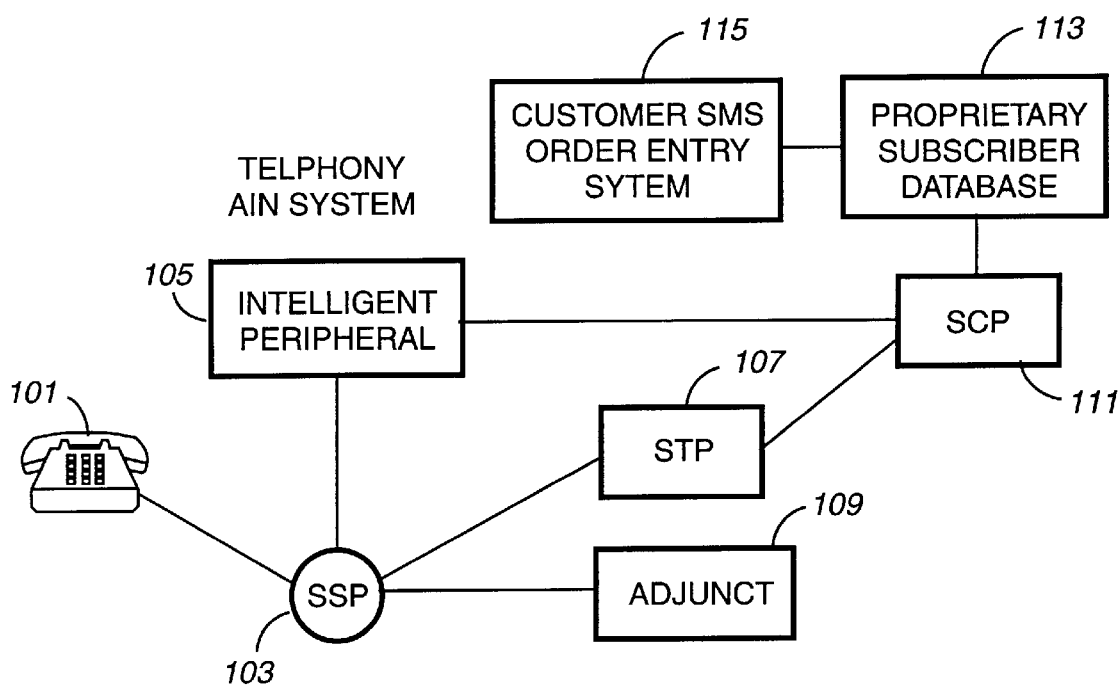
FIG. 1 is a functional block diagram of a prior art telephone network conforming to AIN architecture.

FIG. 1 illustrates a network conforming to publicly switched telephone network ("PSTN") architectures for an advanced intelligent network ("AIN") 100. Further information about AIN architecture can be obtained by referring to one or more of the following published documents, whose teachings are incorporated herein by reference.

Bellcore, GR-2802-CORE, Advanced Intelligent Network (AIN) 0.X Issue 1, Generic Requirements, Issue 2, December 1993.

Bellcore, GR-1129-CORE, Advanced Intelligent Network (AIN) 0.2 switch Intelligent Peripheral Interface (IPI) Generic Requirements, ILC 1E, November 1994.

ISC-IP Interface Specification, Bellcore, SR-3511.

The AIN system 100 is associated with a regional node of the PSTN. A telephone unit 101, available to a "local" PSTN user, links to the regional node through a signal switch point (SSP) complex 103. The SSP 103 connects to an intelligent peripheral (IP) system 105, a hierarchical network of signaling transfer points (STPs) 104, and an adjunct system 109.

The IP 105 provides switched connections for telephone calls passing through the respective regional node (e.g., between local and trunk lines traversing the node), and controls service applications associated with respective calls (conferencing, voice announcements, speech recognition applications, call forwarding, and more). The SSP 103 supports communications between telephones such as the unit 101 and the IP 105 using ISDN (Integrated Services Digital Network) connections.

The SSP 103 communicates through the STPs with a service control point (SCP) 111, using a known signaling system and SS7 packet-switched message format. The IP 105 and the SCP 111 coordinate service logic functions (e.g., functions required to play voice announcements) using a known "1129+" signaling protocol. Subscriber-specific data is stored in a proprietary subscriber database 113 coupled to the SCP 111. A customer SMS (Service Management System) 115 where customer services are provisioned, that is, information collected from a subscriber is coupled to the proprietary subscribers' database 113.

Call connections between local telephones such as the telephone 101 and other local telephones are formed by operations of the IP 105 and the SSP 103. Connections between local telephone 101 and remote telephones associated with remote SSPs and IPs are formed by transmission of call setup messages between the SSP 103 and the remote SSPs via the STP 104 (and other STPs if appropriate) as well as the SCP 111 (and remote SCPs if appropriate). Upon determining that a path exists for a required remote call connection, the SSP 103 and the other SSPs cooperate with respective IPs to establish the connection.

Message communications, between SSPs such as the SSP 103 and both respective IPs such as the IP 105 and associated SCPs such as the SCP 111, are required to set up call connections and administer telephone user services associated with respective calls. Such message communications are conducted through a common channel signaling (CCS) network formed between the SSPs, the STPs, and the SCPs using the aforementioned SS7 packet switched signaling protocol. The SS7 protocol is used as a network transport layer to facilitate message communication within the CCS network. A regional CCS network, encompassing a region containing the local switching office nearest to the telephone 101 and other switching offices, contains a hierarchy of STPs associated with a hierarchy of SCPs. Each SSP, at local levels nearest to individual user telephones such as 101, connects to two SSPs associated with the respective level. This redundancy is useful to produce high reliability.

Message communications between IPs such as the 105 and SCPs such as the SCP 111 are conducted in the previously mentioned "1129+" signaling protocol. That protocol enables service logic running on the SCPs to coordinate actions with service logic running on the IPs during delivery of telephone services to telephones such as the telephone 101.

Operations of elements 103–111 enables an authorized user of the telephone 101 (e.g., the owner of the telephone or an authorized representative of the owner) to administer services to which the owner of the telephone has subscribed (both conventional services, such as call waiting and call forwarding, and new services yet to be defined) without required assistance of operators or other human representatives of the telephone company that interfaces to the telephone.

The SSPs are program-controlled telephone switching systems (access either tandem switches or end officers) without local networks connecting to user telephones in a local subregion. They form local interfaces to the aforementioned CCS network.

The SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

The SCPs support multiple applications, each containing logic defining the handling of individuals' calls. After determining actions to be performed in response to a specific query, the SCP sends instructions for handling the respective call back to the SSP that initiated the inquiry. Different services/applications may be offered at different SCPs.

Adjuncts 109 are also stand-alone network systems. They are functionally equivalent to SCPs, but each communicates directly with only one locally associated SSP (whereas SCPs can communicate with multiple SSPs, both within and external to a local region or sub-region). In operation, such adjunct networks enable the development and delivery of telephony services which are not totally reliant on SSPs and SCPs for implementation.

The AIN system can broadly be divided into two types of segments, a call service segment and a call setup/routing segment. The call service segment includes the IP 105 and the SSP 103. The call setup/routing segment provides traffic switching and includes the STP 107 and the SCP 111. The principal difference between the SCP 111 and the IP 105 is the SCP 111 does not support caller service interaction such as voice announcements, voice response, DTMF (dual tone multi-frequency signal generated by touch tone telephones), call waiting, and call forwarding. For example, a caller to a subscriber "find me" service would be routed through the call setup/routing segment of the SCP 111 through the STP 107. The SCP 111 retrieves the subscriber service data from the proprietary subscriber database 113 that is keyed to the telephone number dialed the specific incoming call. If the telephone number subscriber has an active "find me" an ordered list, a message is sent from SCP 111 via 1129+ protocols to the IP 105 to play the appropriate outgoing message, e.g., "Looking for Mr. Jones." The SCP 111 sends another message to the IP 105 to dial the first number as specified in the subscriber's order list stored on the proprietary subscriber database 113. Service logic in the SCP 111 will proceed through the list until the caller call is terminated by either reaching the desire party Mr. Jones or by terminating the call by a phone mail or by terminating the call by playing a default announcement notifying the caller that all telephone numbers have been tried and the party is unavailable. The number of communications between the SCP and IP can be large, especially with a limited protocol such as 1129+. The SCP 111 contains service logic for commanding the IP 111 stored in the subscriber ordered "find me" list located on the proprietary subscriber database 113. The SCP 111 continues retrieving stored subscriber information from the proprietary subscriber database 113 and sending 1129+ commands to the IP 105 until the process is complete.

Data stored on proprietary subscriber database 113 is updated by a customer service operator using customer SMS 115. A subscriber usually calls in to speak to the customer service operator to modify data such as the find me lists, pins (Personal Identification Numbers), phone mail options and other subscriber-specific data necessary for other subscriber services.

It is important to understand that the present invention is not limited to AIN network implementations currently in use in North America and described herein. Many other telephony Intelligent Network implementations are used throughout the world. These other Intelligent Network standards may include other signaling standards and network protocols. Therefore it should be understood that the other Intelligent Network implementations are contemplated and come within the true scope and spirit of this present invention.

Figure 2:
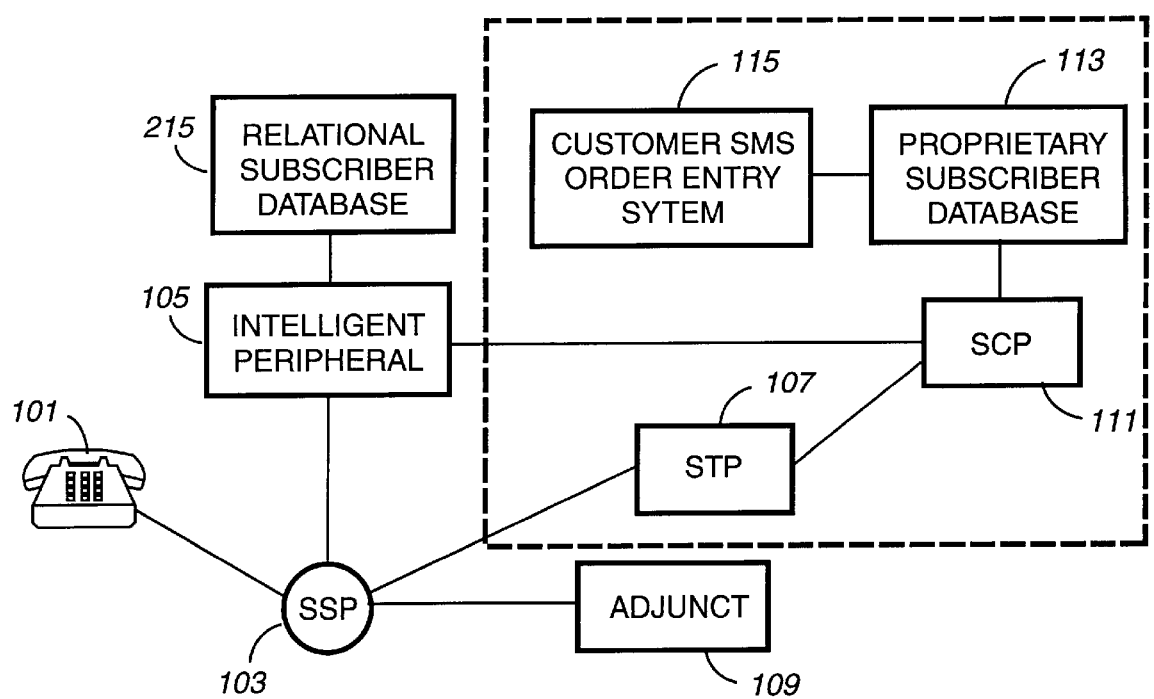
FIG. 2 is a functional block diagram of a telephone network conforming to AIN architecture according to the present invention.

FIG. 2 is a functional block diagram 200 of a telephone network conforming to AIN architecture according to the present invention. Notice that the components are the same as the AIN of FIG. 1 except here a (subscriber specific data) regional relational database 215 is directly coupled to the IP as contrasted with the AIN system shown in FIG. 1 where the IP 105 was coupled to proprietary subscriber database 113 via SCP 111. The technique of directly coupling a database is well known. Typically any computer communications interface can be used. In another embodiment, the regional relational database 215 is running on the IP system itself, without the need of directly coupled external communications. All the components of the call setup/routing segment 107, 111 and 113 are optional (as denoted by the broken line).

Figure 3:
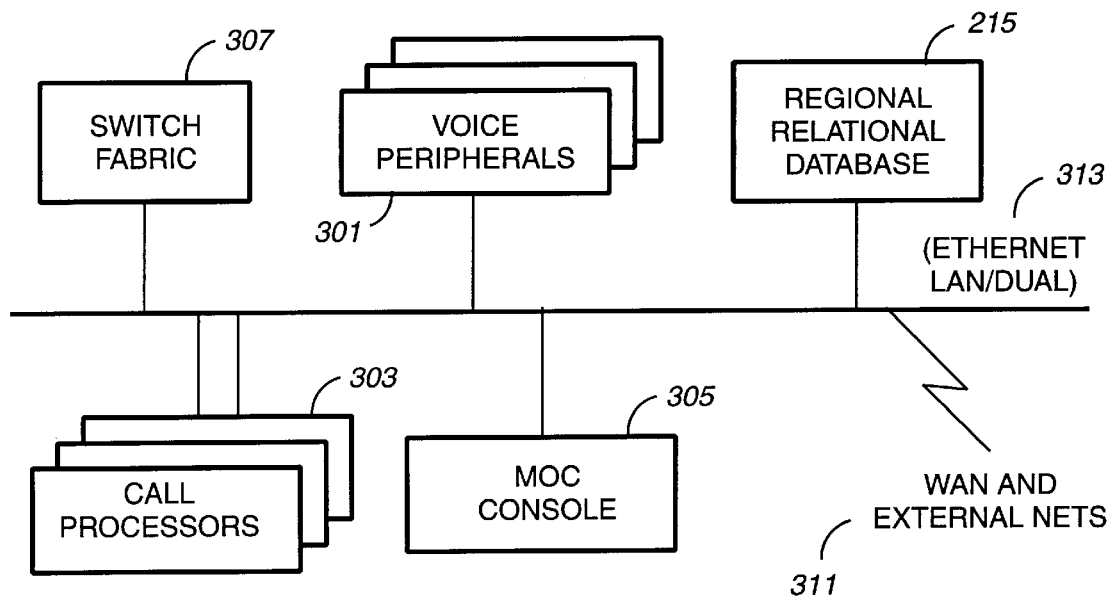
FIG. 3 is a block diagram of the hardware architecture of an intelligent peripheral (IP) system for the network of FIG. 2.

FIG. 3 shows the principal components 300 of the IP system 105 of FIG. 1. IP system 105 is preferably based upon an IBM MSP/6000 system. Standard elements of an MSP/6000 system include a "switch fabric" complex 307, voice peripherals 301, call processors 303, a maintenance and operations console (MOC) processor 305, all connected via communications links Ethernet/LAN 313 and external WAN 311. The regional relational database 215 for subscriber data is attached to Ethernet/LAN 313. Critical components including voice peripheral processors 301 and call processors 303 are configured redundantly to ensure continuous availability in case of any component failure. Further information on the IBM MSP/6000 system can be found in the patent application entitled "Multi-processor systems used as an AIN system" application Ser. No. 08/792,018 by Deborah L. Acker and Thomas E. Creamer and assigned to International Business Machines (IBM) and is incorporated herein by reference. Customize telephony services running on MSP/6000 include detailed billing, call forwarding, call waiting, voice announcements, voice response, keyboard response, debit card call, detailed billing, peak/off peak charges and more.

Figure 4:
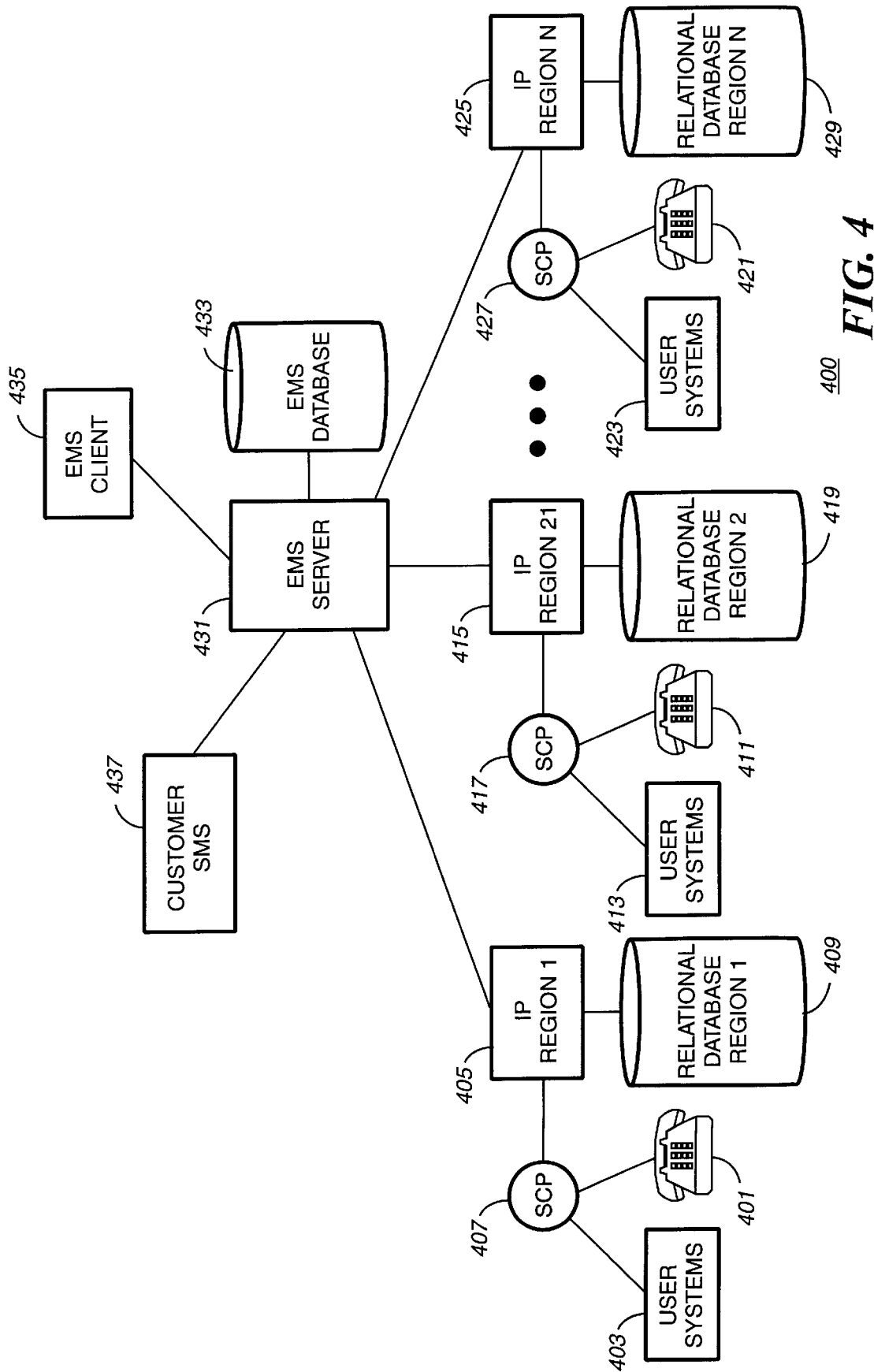
FIG. 4 is a functional block diagram of a telephone network conforming to AIN architecture of FIG. 2 with customer SMS provisioning system according to the present invention.

FIG. 4 is a functional block diagram of a telephone network conforming to AIN of FIG. 2 architecture with a customer SMS provisioning system 400 according to the present invention. Regional IPs 405, 415, 425 perform AIN services for defined regional calling area. Regional areas can be defined by geographical regions, by telephone area codes or by any other defined service area. Each of the regional IPs 405, 415 and 425 is coupled to regional relational databases 409, 419,429, wherein each database 409, 419, and 429 corresponds to the AIN architecture of FIG. 2, i.e., database 215. associated SCPs 407,417,427, telephones 401, 411, 421 and enduser systems 403, 413, 423. The end-user systems 401, 411, 421 comprise a data processing system capable of communicating via an SCP to an IP. Typical data processing systems are PCs capable of running Web browser software such as Netscape Navigator, Microsoft Internet Explorer or equivalent. The end-user system 401, 411, 421 communicates to a regional IP 405, 415, 425 via Internet (not shown) or through direct dial-in to an IP and optionally through an SCP. An EMS (Element Management Server) 431 is a central interface machine to the IP systems 405, 415, 425. The EMS 431 is sometimes referred to as the NOA GUI (Network Operating Administration Graphical User Interface) because operations personnel will interface to this machine in order to maintain IP systems and the subscriber databases 409, 419, 429. There are three principle interface methods to EMS 431. One interface method is a customer SMS 437. A second interface method is via EMS client(s) 435. And the third interface method is at the EMS server 431 itself. Using any of these three interface methods subscriber-specific data residing on the subscriber databases 409, 419, 429 can be updated. In the first method, an operator using the customer SMS 437 can update the subscriber databases 409, 419, 429. In the second method, services provide personnel can update database entries via EMS client(s) 425. And in the third method, a subscriber can make updates to his/her subscriber-specific date via IVR system coupled to telephones 401, 411, 421 or through end-user systems 403, 413, 423.

The EMS server 431 acts as a store-forward facility to propagate data from EMS database 433 between customer SMS system 437 and regional specific subscriber application data stored in each regional relational databases 409, 419, 429. Data propagates from customer SMS system 437 to a regional IPs 405, 415, 435 and along the opposite path. This bi-directional data path may not have the same data flowing in both directions. The connection between customer SMS system and EMS server 431 is via some customer defined interface. The connection between EMS server 431 and the regional IPs 405, 415, 425 is TCP/IP.

The EMS server 431 is an HACMP cluster a highly available cluster multiprocessor (HACMP) machine. The HACMP consists of a plurality of machines each able to process database request in a concurrent manner. If one machine goes down, the other machine continues processing. In addition, capabilities such as load balancing of the database requests and fail-over of database hardware are incorporated. The HACMP automatically re-routes database requests to active machines to provide a database server with little or no down time during hardware failures.

Figure 5:
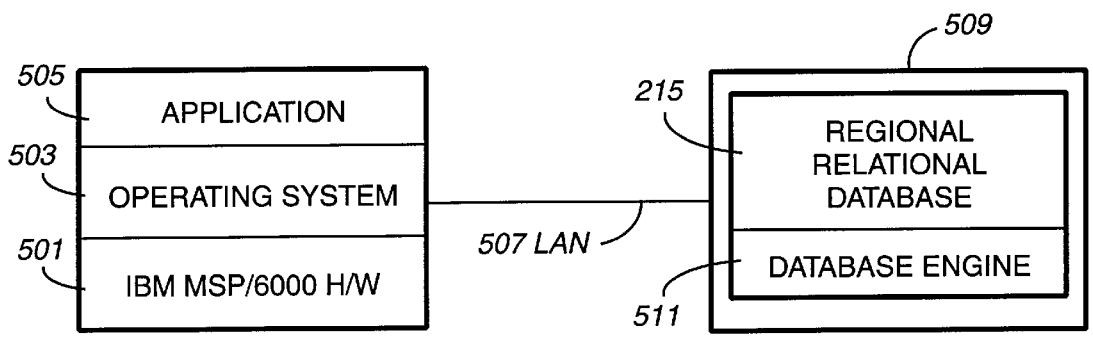
FIG. 5 is a block diagram of the hardware architecture of an intelligent peripheral (IP) system of FIG. 3, illustrating the use of a subscriber database according to the present invention.

FIG. 5 is a block diagram 500 of an IP regional system 405, 415, 425 of FIG. 4 coupled via LAN 507 to a database server 509 containing a subscriber database 215 and corresponding database engine 511. The IP system 500 preferably comprises an IBM MSP/6000 computer hardware platform 501 with an operating system 503 such as AIX with database APIs such as IBM DB/2 or Oracle SQL for accessing a subscriber database server 509. An application 505 written in any of a variety of programming languages such as C/C++, Assembler, JAVA, or SmallTalk is used to create a desired application. The database engine 511 can be a relational database such as IBM DB/2 or Oracle or equivalent. The organization of the regional relational database 215 is directed by the subscriber service provider. This provides the service provider with great flexibility in the structure and arrangement of the subscriber data. The regional relational database 213 is a collection of subscriber-specific data that is dependent on the type of subscriber service being offered by the service provider. Typical subscriber data may include, find me lists, out going announcements, service plans, subscriber telephone number and any other data necessary for a particular subscriber service. The use of a standard relational database allows for the use of a wide variety of database tools and maintenance options.

In the preferred embodiment, the database server 509 is an HACMP machine. Further information on the direct coupling of a relational database to an IP can be found in the patent application entitled "Subscriber Database On An Intelligent Peripheral in an Advanced Intelligent Network (AIN)," application Ser. No. 09/079,664 by Jonathan J. Silver and assigned to International Business Machines (IBM) and is incorporated herein by reference. The regional databases 409, 419, 429 contain application specific data (called internal data) for application 505 and subscriber modifiable data (called provisional data) customized to the subscriber service.

The application 505 running at the regional IPs 405, 415, 425 can accept updates from the customer SMS data stored at EMS database 433. For each of the regional IPs 405, 415, 425, the application 505 accepts updates designated for corresponding regional databases 409, 419, 429. There is no communication among the regional IPs 405, 415, 425. Predefined updates to the regional subscriber databases 409, 419, 429 are sent to the EMS server 431 to the EMS database 433 be forwarded to the customer SMS 437.

A service provider, defines as part of the database schema definition, for both the EMS database 433 and the regional subscriber databases 409, 419, 429 features called database triggers. These database triggers are industry standard database features that allow architects of databases to automatically notify other software applications that a preselected database record or range of database records is being modified. These software applications can perform any desirable task in response to a database update including the task of rejecting a request that a specific database entry be updated. For example, a service provider may wish to implement a PIN (Personal Identification Number) for a given subscriber service as a procedure to enhance security. The use of PINs to authorize access to subscriber-specific data is known. Many service providers allow users to update their own PIN via an IVR (Interactive Voice Response) system or even the Internet. It is common for service providers to enforce a security policy that user PINs be a certain number of digits in length or that PINs comprise specific alphanumeric characters. Through the use of triggers, a database developer can have any attempted changes to a PIN entry in a database trigger a previously designated external application. The application in this PIN example, could be a PIN authentication application, which is invoked when a change to the database record is requested. This PIN authentication application authorizes the change or rejects the requested change because the PIN does not conform to the desired security policy. The use of a trigger allows the separation of the database application from other software applications. This makes database administration and maintenance easier because the external applications signaled by the database triggers can be separately maintained.

The use of database triggers gives service providers the ability to "trigger" a wide variety of AIN system events. The trigger can even notify two or more applications that a predefined database record is being altered. The application 505 sends predefined updates to EMS servers to forward to customer SMS systems. Typical predefined updates perform a variety of functions including inventorying and tracking the use of various services, deleting voice messages after the messages reach an expiration date, updating external database servers (not shown) for disaster recovery or off-line administration, issuing billing records to external billing processors (not shown), and resetting subscriber data such as out going announcements to system default messages.

Instead of transferring single, unrelated messages between regional IPs 405, 415, 425 and the EMS database 433 of EMS server 431, the updates are packaged together into a related set of commands. Each of application 505 running on regional IPs 405, 415, 425 package together these customer SMS updates based on transactionids and send these updates to EMS server 431 to be forward to the customer SMS 437. This packaging together of updates related by transaction-ids greatly reduces the amount of network traffic between regional IPs 405, 415, 425 and the EMS server 431. Example messages sent between regional IPs 405, 415, 425 and the EMS server 431 include:

Add—Add a new subscriber or a new service for a subscriber, (followed by data for that subscriber and service).

Delete—Delete a service from a subscriber or delete the subscriber.

Update—Update the provisioning information for one or more services. The data may consist of adds or deletes to list type data or changes to attribute or list type data.

Query—Query all provisionable data for one or all of the subscriber services.

Suspend—Suspend a subscriber from accessing their service.

Resume—Resume a subscriber and re-enable their service.

ChangeTN—Change a subscriber telephone number for all of their services.

ChangeSMS—Change the customer order entry system that owns the subscriber to the new one listed. From now on this Order Entry system will receive the "backfeed updates." Backfeed updates are updates made from any entry system other than from the SMS. These backfeed updates are sent to the SMS.

It should be understood that updates to subscriber data on regional IPs 405, 415, 425 and the EMS server 431 can originate from three sources telephones 401, 411, 421; end-user units 403, 413, 423 and customer SMS 437. As discussed above, all data updates are kept synchronized between regional databases 409, 419, 429 and the EMS server 431. This allows updates made through one source to be available to other sources. The availability of three distinct sources enables the subscriber to modified his/her subscriber based on which method is most convenient. As example, simple updates to a PIN may be made over the telephones 401, 411, 421 using an IVR system communicating to a regional IP. More complicated updates such as reorganizing the telephone list for a find-me service may be made in two ways. First, the service subscriber can make updates using a PC or end-user units 403, 413, and 423. This method allows for more complicated updates, anytime of the day, without the need for operator assistance. Second, the service subscriber can provide updates over the phone by speaking with the service provider operator. The operator enters the updates via SMS 437.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. An Automated Intelligent Network (AIN) telephone system comprising at least one central office switching system, a system comprising:

a service provider system for providing customizable subscriber services based upon subscriber-specific data stored in an EMS database, wherein said subscriber-specific data is selectively updated by a service provider;

at least one intelligent peripheral system coupled with a central office switching system wherein said intelligent peripheral system includes a regional relational database for storing regional subscriber-specific data said intelligent peripheral system further comprises:

one or more voice peripherals for providing voice announcements and for receiving updates to said regional subscriber-specific data stored on said regional relational database using one or more end user telephones;

at least one direct-dial communications interface for receiving updates to said regional subscriber-specific data on said regional relational database using one or more end-user data entry devices coupled to said intelligent peripheral system; and a bidirectional data path connected between said intelligent peripheral system and said service provider system for transferring at least part of said regional subscriber-specific data from said regional relational database of said intelligent peripheral system to correspondingly update said subscriber-specific data in stored in said EMS database of said service provider system.

2. The AIN telephone system of claim 1 wherein said service provider system further comprises:

a communication interface to said service provider system for selectively updating said subscriber-specific data on said EMS database using one or more client data entry devices; and store-forward application for sending at least part of said subscriber-specific data stored in said EMS database of said service provider system to said regional relational database of said intelligent peripheral systems so as to correspondingly update said regional subscriber-specific data.

3. The AIN telephone system of claim 1 further comprising an application for transferring updates of said regional subscriber-specific data that are packaged together into a related set of commands based on transaction-ids from said regional subscriber-specific data from said regional relational database of said intelligent peripheral system to correspondingly update said subscriber-specific data in stored in said EMS database of said service provider system.

4. The AIN telephone system of claim 3 wherein said regional relational database of said intelligent peripheral system further comprises settable update triggers, wherein said update triggers are set to indicate said subscriber-specific data has been updated.

5. In an Automated Intelligent Network (AIN) telephone system a method of updating subscriber-specific data comprising the steps of:

providing customizable subscriber services based upon subscriber-specific data stored in an EMS database as part of a service provider system, wherein said subscriber-specific data is selectively updated by a service provider;

coupling at least one intelligent peripheral system with a central office switching system, wherein said intelligent peripheral system includes a regional relational database for storing regional subscriber-specific data, said intelligent peripheral including one or more voice peripherals and at least one direct-dial communications interface, said intelligent peripheral system configured to carry out the sub-steps of:

using said one or more voice peripherals for providing voice announcements and for receiving updates to said regional subscriber-specific data stored on said regional relational database using one or more end user telephones;

using said at least one direct-dial communications interface for receiving updates to said regional subscriber-specific data on said regional relational database using one or more end-user data entry devices coupled to said intelligent peripheral system; and coupling a bidirectional data path between said intelligent peripheral system and said service provider system for transferring at least part of said regional subscriber-specific data from said regional relational database of said intelligent peripheral system to correspondingly update said subscriber-specific data in stored in said EMS database of said service provider system.

6. The method of updating subscriber-specific data of claim 5, wherein said step of providing customizable subscriber services based upon subscriber-specific data stored in an EMS database as part of a service provider system includes a service provider system with a communication interface to one or more client systems and further comprising the steps of:

selectively updating said subscriber-specific data on said EMS database using said one or more client systems through said communication interface; and storing into said EMS database and forwarding at least part of said subscriber-specific data from said EMS database of said service provider system to said regional relational database of said intelligent peripheral system so as to correspondingly update said regional subscriber-specific data.

7. The method of updating subscriber-specific data of claim 5 wherein said sub-step of coupling a bidirectional data path further comprises an application running on said intelligent peripheral system for transferring updates of said regional subscriber-specific data that are packaged together into related set of commands based on transaction-ids from said regional subscriber-specific data from said regional relational database of said intelligent peripheral system to correspondingly update said subscriber-specific data in stored in said EMS database of said service provider system.

8. The method of updating subscriber-specific data of claim 7 wherein said sub-step of coupling further comprises coupling said intelligent peripheral system including regional relational database with settable update triggers, wherein said update triggers are set to indicate said subscriber-specific data has been updated.

9. An Automated Intelligent Network (AIN) telephone system comprising at least one central office switching system, a system comprising:

at least one EMS service provider system comprising:
        an EMS server;
        an EMS database;
        at least one EMS client attached to the EMS server; and
        at least one customer EMS system attached to the EMS server;
    wherein the EMS service provider system provides subscriber-specific data stored in the EMS database that can be selectively updated by the at least one EMS client and the at least one customer EMS system and the subscriber-specific data is used to provide customizable subscriber services; and
    at least one intelligent peripheral system coupled with a central office switching system and coupled over a bidirectional link with the EMS service provider system, each of the one or more intelligent peripheral systems comprising:
        a regional relational database for storing regional subscriber-subscriber-specific data;
        one or more voice peripherals for providing voice announcements and for receiving updates to the regional subscriber-specific data stored on the regional relational database using one or more end user telephones; and
        at least one direct-dial communications interface for receiving updates to the regional subscriber-specific data on the regional relational database using one or more end-user data entry devices coupled to the intelligent peripheral system;
    wherein at least part of the regional subscriber-specific data from the regional relational database of the intelligent peripheral system is transferred via the bidirectional link to correspondingly update the subscriber-specific data in stored in the EMS database of the service provider system.

10. The system according to claim 9, wherein the bidirectional link is a TCP/IP link.

11. The system according to claim 9, wherein the regional relational database contains triggers that a predefined database record in the regional relational database is being altered so as to automatically forward these updates to the EMS database of the EMS service provider system.

12. The system according to claim 9, wherein the regional relational database packages together updatates related by transaction-ids so as to reduce the amount of traffic over the bidirectional link.

* * * * *